No. 857,096. PATENTED JUNE 18, 1907.
A. C. McCORD.
CONVEYING SYSTEM.
APPLICATION FILED NOV. 4, 1902. RENEWED JAN. 2, 1906.
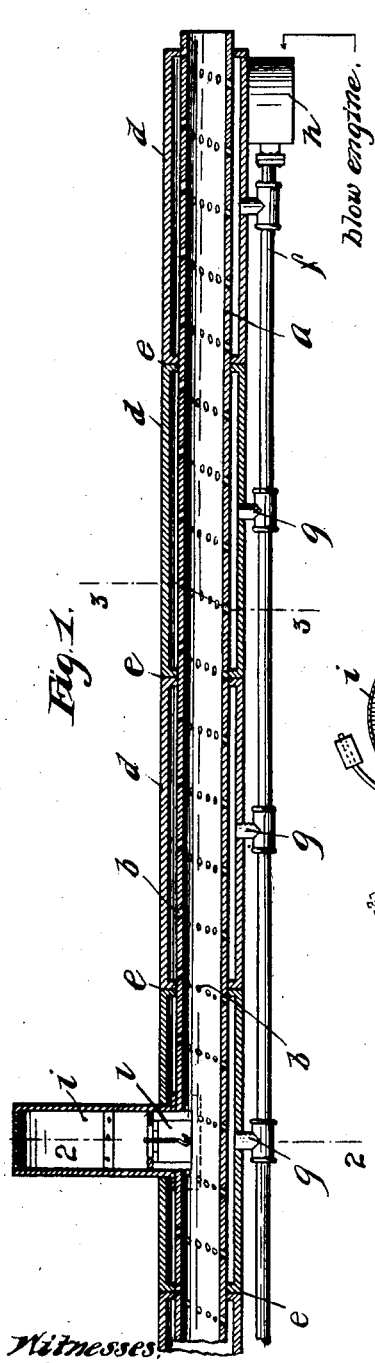
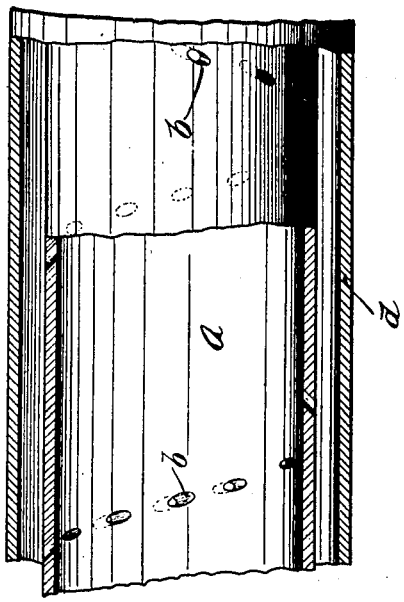
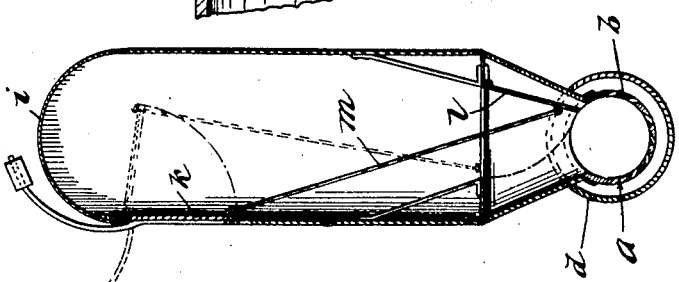
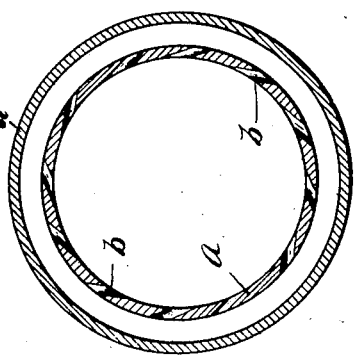
Witnesses:
H. S. Kilgore
Malie Hoel.
Inventor:
Alvin C. McCord,
By his Attorneys,
Williamson & Merchant

UNITED STATES PATENT OFFICE.

ALVIN C. McCORD, OF CHICAGO, ILLINOIS.

CONVEYING SYSTEM.

No. 857,096. Specification of Letters Patent. Patented June 18, 1907.

Application filed November 4, 1902. Renewed January 2, 1906. Serial No. 294,153.

*To all whom it may concern:*

Be it known that I, ALVIN C. McCORD, a citizen of the United States, residing at Chicago, in the county of Cook and State of Illinois, have invented a certain new and useful Improvement in Conveying Systems, (Case 12,) of which the following is a full, clear, concise, and exact description, reference being had to the accompanying drawings, forming a part of this specification.

My invention has for its object to provide an improved conveying system intended and adapted for use in conveying either light or heavy materials for long distances. For example, it is well adapted for the conveying of grain, sand, coal, or ore, and many other kinds of material. The preferred conveying fluid employed is atmospheric air.

The chief characteristic feature of the invention is inlets for the air, so shaped and applied that the air will be introduced into the conveyer in a spiral direction and made to follow a spiral course in its movement toward the exit end of the conveyer.

Another important characteristic feature is that the air inlets are so shaped and applied that the air enters the conveyer tangential to the bore of the conveyer tube.

The joint effect of these two features is to compel the air to take a spiral course directly adjacent to the wall of the conveyer pipe while at the same time moving lengthwise of the pipe toward the exit end of the same. In this way a cushion of air is provided adjacent to the wall of the tube which prevents the forcible contact of the conveyed material with the wall of the tube, while at the same time, the material is carried forward with the whirling and traveling body of air.

As another feature of the invention, the conveyer pipe is surrounded by an air jacket, which air jacket is divided into chambers or sections separated from each other lengthwise of the conveyer pipe and jacket, thereby making it possible to apply air at different pressures to different sections of the conveying system.

In accordance with another feature of my invention, the preferred means for effecting the flow of the conveyed fluid through the openings resides in a blowing engine, a blowing pipe extending longitudinally of the conveying pipe and separated chambers or compartments in communication with the openings and connected with the blower pipe by parallel branches. In order that the conveyed material may not be likely to congest within the conveying pipe, the blowing engine or source of air pressure is located at the exit end of the conveying pipe, causing the greatest pressure at that end of the pipe, the pressure gradually dropping off toward the other end of the pipe, by which arrangement there is a gradual acceleration in the speed of the conveyed material toward the exit end.

The conveying pipes may be provided with intakes or chutes, each desirably provided with a pair of doors. One door controls the communication of the conveying pipe with the corresponding chute and the other door controls the opening through which material is passed. In order that the doors may be properly operated, mechanism is provided for working the same together, so that when a chute is thrown into communication with the conveying pipe the opening through which the material that is to be conveyed is passed is closed, and vice versa.

I will explain my invention more fully by reference to the accompanying drawing, in which—

Figure 1 is a sectional elevation of the conveying system equipped in accordance with the invention; Fig. 2 is a sectional view on line 2—2 of Fig. 1; Fig. 3 is an enlarged view on line 3—3 of Fig. 1; Fig. 4 is an elevation partially in section of a portion of the conveying pipe.

Like parts are indicated by similar characters of reference throughout the different figures.

The conveying pipe $a$ is of any suitable diameter, an inner diameter of a foot having been found successful in practice, while the wall of the pipe is sufficiently thick to enable the apertures or openings $b$ to have the requisite directions to initiate the travel of the streams of fluid forced through the openings in the proper directions; I have found the thickness of one-half an inch to be well adapted for the purpose. These openings, as illustrated in Fig. 3 are preferably tangential with respect to the inner surface of the conveying pipe, and are inclined toward the exit end $c$ of the conveying pipe. These openings are relatively spirally arranged as indicated most clearly in Fig. 4, being desirably spirally alined, the openings in each spiral line thus co-operating throughout the entire length of the pipe to maintain the conveying fluid in the desired spiral line of travel. In this preferred way a filmy cushion of fluid is provided next the wall of the tube, preventing forcible contact of conveyed material with the tube, while there is surrounded by such filmy cushion a conveying column or element of fluid that is thus adapted to safely convey material.

The openings b are preferably uniformly distributed lengthwise of the pipe a, the conveying pipe being jacketed wholly or partially by chambers d, which are substantially distinct from each other, the chambers being separated by partitions e e that snugly inclose the conveying pipe, the said partitions being desirably integrally formed with the peripheral walls of the chambers. The blower pipe f is extended longitudinally of the conveyer pipe, the connections or pipe branches g affording communication between the pipe f and the chambers d. The branches g are thus parallel with respect to each other, and the air that is forced through the same circulates about the interior of the chambers and is distributed through the openings in the pipe a that are in direct communication with the chamber, the partitions e serving to properly confine the air. Any suitable means for forcing the air through the openings b and the branches g may be employed, there being indicated a blowing engine h in direct communication with the pipe f. This blowing engine is desirably located near the exit end of the conveying pipe, so that the pressure impressed thereby is highest at this end, decreasing at each subsequent branch connection g. The object of this location of the engine is to cause the air to be impressed through the openings b at a pressure which gradually increases toward the exit end of the conveying pipe, so that the material, as saw-dust, shavings and other matter, will gradually have its speed accelerated as it approaches the exit, so that this material will not have an opportunity to accumulate and thereby impede the passage of the material behind. The material that is to be conveyed may find its entrance at the rear end of the pipe, or it may be passed through a chute i desirably passing through a chamber or jacket d into a pipe a. The chute may be constructed in any desirable manner and is preferably provided with two doors, k and l, located at the bottom and top of the chute or intake. The upper door k controls the opening through which material that is to be conveyed is poured into the chute, while the lower door l controls the connection between the conveying pipe and the chute, one door being closed when the other is open, preferably through the agency of link m, which causes the required relative operation of the doors.

The chamber or jacket d through which the chute passes is sealed therefrom, the only communication between the chamber and the chute being by way of the apertures b.

It will, of course, be understood that the vital features of my invention herein disclosed can be embodied in manifold forms of structure.

1. In a conveying system, the combination with a pipe having spirally directed openings therethrough, of separate chambers distributed along the pipe in communication with the openings therein, and a blowing engine in communication with said chambers, substantially as described.

2. In a conveying system, the combination with a pipe having spirally directed and spirally alined openings therethrough, of separate chambers distributed along the pipe in communication with the openings therein, and a blowing engine in communication with said chambers, substantially as described.

3. In a conveying system, the combination with a pipe having spirally directed openings therethrough tangential with the inner surface of the pipe, of separate chambers distributed along the pipe in communication with the openings therein, and a blowing engine in communication with said chambers, substantially as described.

4. In a conveying system, the combination with a pipe having spirally directed and spirally alined openings therethrough tangential with the inner surface of the pipe, of separate chambers distributed along the pipe in communication with the openings therein, and a blowing engine in communication with said chambers, substantially as described.

5. In a conveying system, the combination with a pipe having spirally arranged openings inclined toward the exit end of the pipe, of separate chambers distributed along the pipe in communication with the openings therein, and a blowing engine in communication with said chambers, substantially as described.

6. In a conveying system, the combination with a pipe having spirally arranged openings inclined toward the exit end of the pipe and tangential with the pipes inner surface, of separate chambers distributed along the pipe in communication with the openings therein, and a blowing engine in communication with said chambers, substantially as described.

7. In a conveying system, the combination with a pipe having spirally directed openings therethrough and inclined toward the exit end of the pipe, of separate chambers distributed along the pipe in communication with the openings therein, and a blowing engine in communication with said chambers, substantially as described.

8. In a conveying system, the combination with a pipe having spirally directed and spirally alined openings therethrough and inclined toward the exit end of the pipe, of separate chambers distributed along the pipe in communication with the openings therein, and a blowing engine in communication with said chambers, substantially as described.

9. In a conveying system, the combination with a pipe having spirally directed openings therethrough and inclined toward the exit end of the pipe, tangential with the inner surface of the pipe, of separate chambers distributed along the pipe in communication with the openings therein, and a blowing engine in communication with said chambers, substantially as described.

10. In a conveying system, the combination with a pipe having spirally directed openings therethrough and inclined toward the exit end of the pipe, tangential with the inner surface of the pipe, of means for forcing fluid through said openings, substantially as described.

11. In a conveying system, the combination with a pipe having spirally directed and spirally alined openings therethrough, and inclined toward the exit end of the pipe, of means for forcing fluid through said openings, substantially as described.

12. In a conveying system, the combination with a pipe having spirally directed openings therethrough and inclined toward the exit end of the pipe, of means for forcing fluid through said openings, substantially as described.

13. In a conveying system, the combination with a pipe having spirally arranged openings inclined toward the exit end of the pipe and tangential with the pipes inner surface, of means for forcing fluid through said openings, substantially as described.

14. In a conveying system, the combination with a pipe having spirally arranged openings inclined toward the exit end of the pipe, of means for forcing fluid through said openings, substantially as described.

15. In a conveying system, the combination with a pipe having spirally directed and spirally alined openings therethrough, tangential with the inner surface of the pipe, of means for forcing fluid through said pipe, substantially as described.

16. In a conveying system, the combination with a pipe having spirally directed openings therethrough, tangential with the inner surface of the pipe, of means for forcing fluid through said openings, substantially as described.

17. In a conveying system, the combination with a pipe having spirally directed and spirally alined openings therethrough, of means for forcing fluid through said openings, substantially as described.

18. In a conveying system, the combination with a pipe having spirally directed openings therethrough, of means for forcing fluid through said openings, substantially as described.

19. A conveying pipe in combination with means for effecting the spiral flow of fluid therein and a chute or intake for the material in communication with said pipe, said chute having one door controlling communication between the same and the pipe and another door at the reception opening of the chute, the doors being provided with mechanism for operating the same together, the doors being so relatively disposed that the chutes are opened for the reception of material when they are cut off from the pipe, and vice versa, substantially as described.

20. In a conveying system, the combination with a conveying pipe provided with openings therethrough serving to direct fluid toward the exit end of the pipe, of a blowing pipe communicating with the aforesaid pipe at intervals, and a blowing engine located nearest the exit end of the pipe and communicating with said blowing pipe, substantially as described.

21. In a conveying system, the combination with a conveying pipe provided with openings therethrough for directing fluid into its interior toward the exit end of the pipe, of a plurality of separate chambers distributed along said pipe and communicating with the openings therein, and means for forcing air into said chambers and thence through the openings, substantially as described.

22. A conveying pipe in combination with means for effecting the flow of fluid therein and a chute or intake for the material in communication with said pipe, said chute having one door controlling communication between the same and the pipe and another door at the reception opening of the chute, the doors being provided with mechanism for operating the same together, the doors being so relatively disposed that the chutes are opened for the reception of material when they are cut off from the pipe, and vice versa, substantially as described.

23. In a conveying system, the combination with a pipe having spiral perforations therethrough, of an air chamber surrounding said spirally perforated pipe, and means for producing a blast of air in said surrounding air chamber, substantially as described.

In witness whereof, I hereunto subscribe my name this twenty-eighth day of October, A. D. 1902.

ALVIN C. McCORD.

Witnesses:
OWEN S. BIRD,
GEORGE L. CRAGG.